United States Patent
Lin et al.

(10) Patent No.: US 9,154,762 B2
(45) Date of Patent: Oct. 6, 2015

(54) STEREOSCOPIC IMAGE SYSTEM UTILIZING PIXEL SHIFTING AND INTERPOLATION

(75) Inventors: Zhao-Yuan Lin, New Taipei (TW); Chia-Chieh Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 322 days.

(21) Appl. No.: 13/494,381

(22) Filed: Jun. 12, 2012

(65) Prior Publication Data

US 2013/0027391 A1  Jan. 31, 2013

(30) Foreign Application Priority Data

Jul. 29, 2011 (TW) .............................. 100126940 A

(51) Int. Cl.
 *H04N 13/00* (2006.01)
 *G06T 15/00* (2011.01)
(52) U.S. Cl.
 CPC ............ *H04N 13/0007* (2013.01); *G06T 15/00* (2013.01)
(58) Field of Classification Search
 None
 See application file for complete search history.

(56) References Cited

U.S. PATENT DOCUMENTS

| | | | |
|---|---|---|---|
| 6,208,348 B1 * | 3/2001 | Kaye .............................. | 345/419 |
| 6,515,659 B1 * | 2/2003 | Kaye et al. .................... | 345/419 |
| 8,311,318 B2 | 11/2012 | Kao et al. | |
| 8,503,764 B2 | 8/2013 | Kao et al. | |
| 2007/0236560 A1 * | 10/2007 | Lipton et al. .................... | 348/43 |
| 2011/0109620 A1 * | 5/2011 | Hong et al. .................... | 345/419 |

FOREIGN PATENT DOCUMENTS

| | | |
|---|---|---|
| CN | 101908233 | 12/2010 |
| CN | 102088616 | 6/2011 |

OTHER PUBLICATIONS

Zhang, Liang, and Wa James Tam. "Stereoscopic image generation based on depth images for 3D TV." Broadcasting, IEEE Transactions on 51.2 (2005): 191-199.*
Chen, Wan-Yu, et al. "Efficient depth image based rendering with edge dependent depth filter and interpolation." Multimedia and Expo, 2005. ICME 2005. IEEE International Conference on. IEEE, 2005.*
Chinese language office action dated May 6, 2014.
English language translation of relevant paragraphs of office action.
English language translation of relevant paragraphs of CN 102088616 (published Jun. 8, 2011).

* cited by examiner

*Primary Examiner* — Daniel Hajnik
(74) *Attorney, Agent, or Firm* — McClure, Qualey & Rodack, LLP

(57) ABSTRACT

A stereoscopic image system is provided. The stereoscopic image system comprises: a depth detection unit, for receiving a two-dimensional image and a corresponding depth image, and generating a depth level map according to the two-dimensional image and the corresponding depth image; a stereoscopic image generator, for generating a stereoscopic image pair corresponding to the two-dimensional image according to the two-dimensional image and the depth level map; and a stereoscopic image adjusting apparatus, for generating a depth level range map according to the depth level map, and performing a pixel shifting process and an interpolation process to objects within a plurality of depth levels in the stereoscopic image pair to generate an output stereoscopic image pair according to the stereoscopic image pair and the depth level range map.

14 Claims, 9 Drawing Sheets

STEREOSCOPIC IMAGE SYSTEM UTILIZING PIXEL SHIFTING AND INTERPOLATION

CROSS REFERENCE TO RELATED APPLICATIONS

This Application claims priority of Taiwan Patent Application No. 100126940, filed on Jul. 29, 2011, the entirety of which is incorporated by reference herein.

BACKGROUND OF THE DISCLOSURE

1. Field of the Disclosure

The present disclosure relates to stereoscopic image processing, and in particular relates to a system and method thereof to obtain a stereoscopic image by analyzing a depth map.

2. Description of the Related Art

As technologies develop, multimedia systems have become more mature, while user demand for higher visual effects have also increased, such as the upgrade of conventional two-dimensional images to three-dimensional images. Different from the two-dimensional images provided by flat displays such as common TVs, the human brain processes the vision of objects with forward/backward depth perception. Depth perception is caused by the distance (i.e. offset) between the left eye and the right eye, and therefore there are slight differences of the images observed by the left eye and the right eye, respectively. The differences of the left eye image and the right eye image are processed by the human brain, thereby generating depth perception. There are three object position levels perceived by the human brain which are a far, middle and near position. Human vision may automatically adjust to a best viewing angle according to the depth of objects. When an object is observed by the left eye and the right eye from different viewing angles, parallax is generated. There are three conditions of parallax according to objects placed at far, middle and near distances, wherein the three conditions are (1) positive parallax, (2) zero parallax, and (3) negative parallax. The positive parallax is illustrated in FIG. 1A. The left eye image and the right eye image are placed at the position L and R of the screen 101 respectively, wherein the position L is the intersection point between the sight line of the left eye and the screen 101, and the position R is the intersection point between the sight line of the right eye and the screen 101. The sight lines of the left eye and the right eye are crossed behind the screen 101, and the stereoscopic image is displayed at the cross point behind the screen 101. The zero parallax is illustrated in FIG. 1B. The left eye image and the right eye image are overlapped exactly on the screen 101, and the image is also displayed on the screen 101 without stereoscopic perception. The negative parallax is illustrated in FIG. 1C. The left eye image and the right eye image are overlapped completely at the position L and R of the screen 101. The sight lines of the left eye and the right eye are crossed in front of the screen 101, and the stereoscopic image is displayed at the cross point in front of the screen 101.

Although a stereoscopic image can be captured by a stereoscopic camera or a stereoscopic video camera, these devices are not popular and are expensive, and thus not easily attainable. Therefore, algorithms for converting existing two-dimensional images or films into stereoscopic images have been developed. Depth information is usually used in stereoscopic image algorithms, wherein the depth information can be expressed by a depth map. The generation of the depth map can be achieved by using a depth camera, a stereoscopic video camera, or corresponding stereoscopic imaging algorithms. A well-known depth map expresses various depths of different objects in the picture by using a gray-level image, such as gray levels 0-255, wherein the gray level 0 indicates that the object is located at the farthest position from the lens, and the gray level 255 indicates that the object is located at the nearest position from the lens.

Conventional stereoscopic image algorithms, which obtain the left eye/right eye images by using the depth map of the two-dimensional image, may perform a pixel shifting process at different offset levels to the original two-dimensional image objects, but the differences of the objects viewed by the left eye and the right eye are ignored.

BRIEF SUMMARY OF THE DISCLOSURE

A detailed description is given in the following embodiments with reference to the accompanying drawings.

In an exemplary embodiment, a stereoscopic image system is provided. The stereoscopic image system comprises: a depth detection unit, for receiving a two-dimensional image and a corresponding depth image, and generating a depth level map according to the two-dimensional image and the corresponding depth image; a stereoscopic image generator, for generating a stereoscopic image pair corresponding to the two-dimensional image according to the two-dimensional image and the depth level map; and a stereoscopic image adjusting apparatus, for generating a depth level range map according to the depth level map, and performing a pixel shifting process and an interpolation process to objects within a plurality of depth levels in the stereoscopic image pair to generate an output stereoscopic image pair according to the stereoscopic image pair and the depth level range map.

In another exemplary embodiment, a stereoscopic image generating method is provided. The method comprises the following steps of: receiving a two-dimensional image and a corresponding depth image and generating a depth level map according to the two-dimensional image and the corresponding depth image; generating a stereoscopic image pair corresponding to the two-dimensional image according to the two-dimensional image and the corresponding depth image; generating a depth level range map according to the depth level map; and performing a pixel shifting process and an interpolation process to objects within a plurality of depth levels in the stereoscopic image pair to generate an output stereoscopic image pair according to the stereoscopic image pair and the depth level range map.

In yet another exemplary embodiment, a stereoscopic image adjusting apparatus is provided. The stereoscopic adjusting apparatus comprises: a depth level classifier, for a depth level map and generating a depth level range map according to the depth level map; a pixel shifting unit, for receiving the depth level range map and a corresponding stereoscopic image pair, calculating a center line of objects in the stereoscopic image pair according to the depth level range map and the stereoscopic image pair, and generating an adjusted stereoscopic image pair by performing a pixel shifting process to the object according to the center line; and an image combining unit, for receiving the adjusted stereoscopic image pair and performing an interpolation process to the objects in the adjusted stereoscopic image pair to generate an output stereoscopic image pair.

In yet another exemplary embodiment, a stereoscopic image adjusting method is provided. The method comprises the following steps of: receiving a depth level map, and generating a depth level range map according to the depth level map; calculating a center line of the objects in a stereoscopic image pair according to the depth level range map and the stereoscopic image, and performing a pixel shifting process to the objects to generate an adjusted stereoscopic image pair according to the center line; and performing an interpolation process to the objects in the adjusted stereoscopic image pair to generate an output stereoscopic image pair.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1A:
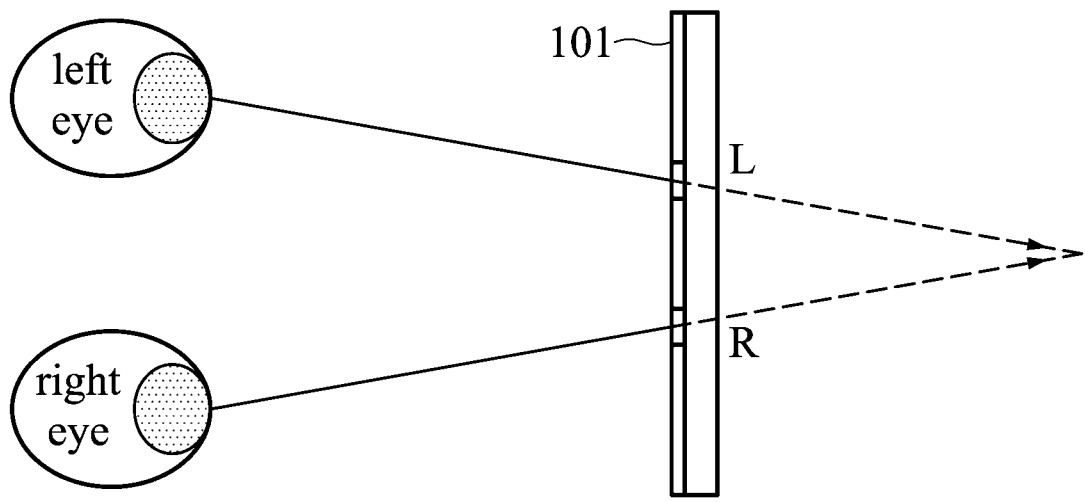
FIG. 1A-1C illustrate a diagram of an object observed by different parallax.
Figure 1B:
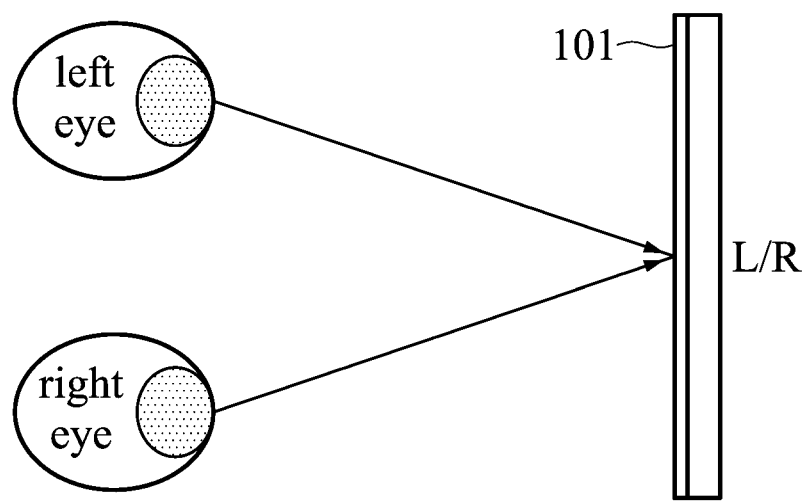
Figure 1C:
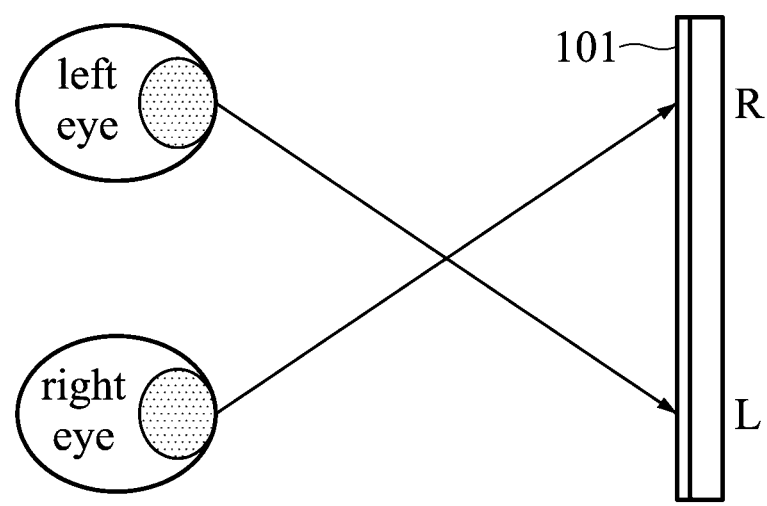
Figure 2:
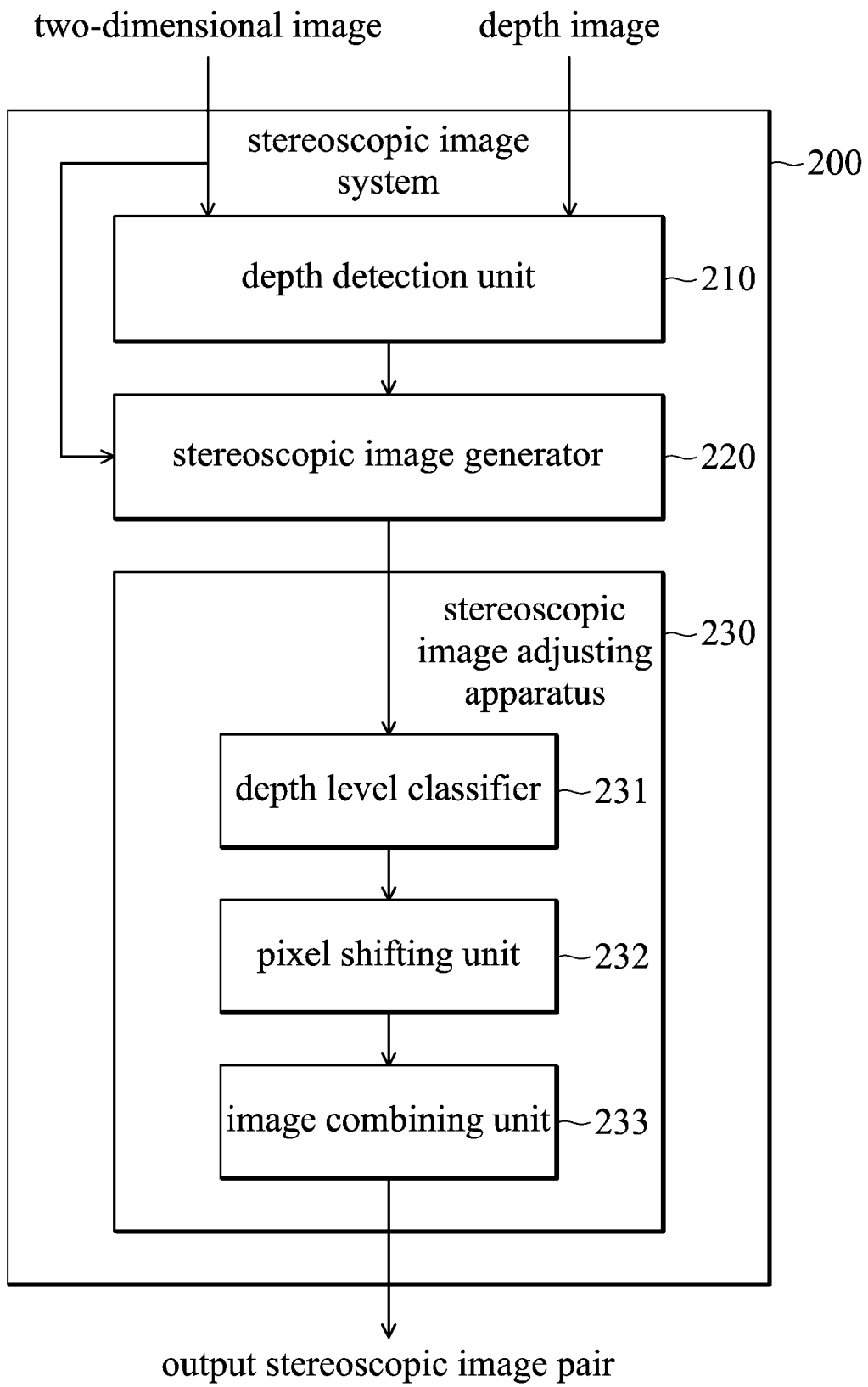
FIG. 2 illustrates a block diagram of the stereoscopic image system according to an embodiment of the disclosure.
Figure 3A:
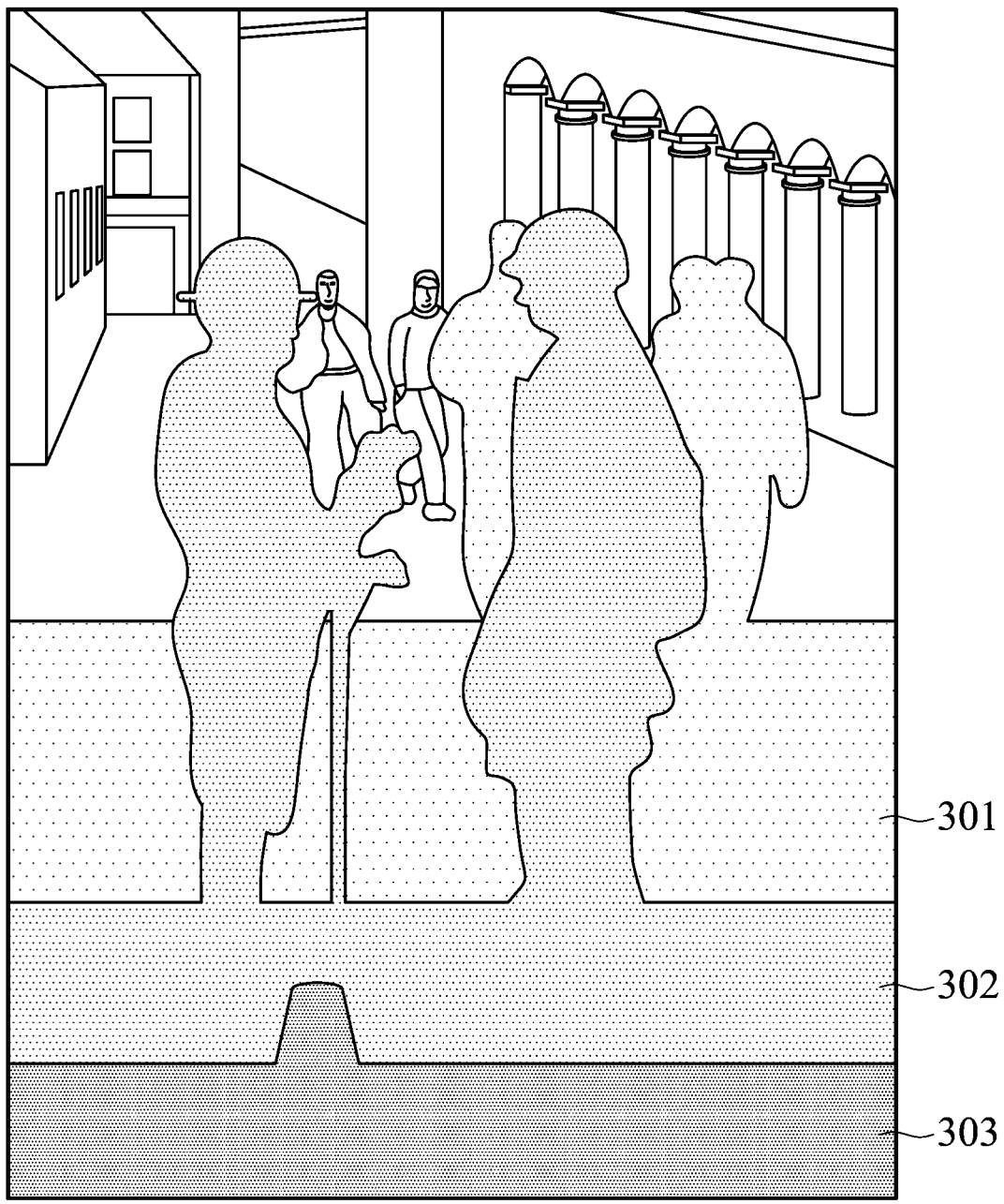
FIG. 3A illustrates a diagram of the depth level range map according to an embodiment of the disclosure.
Figure 3B:
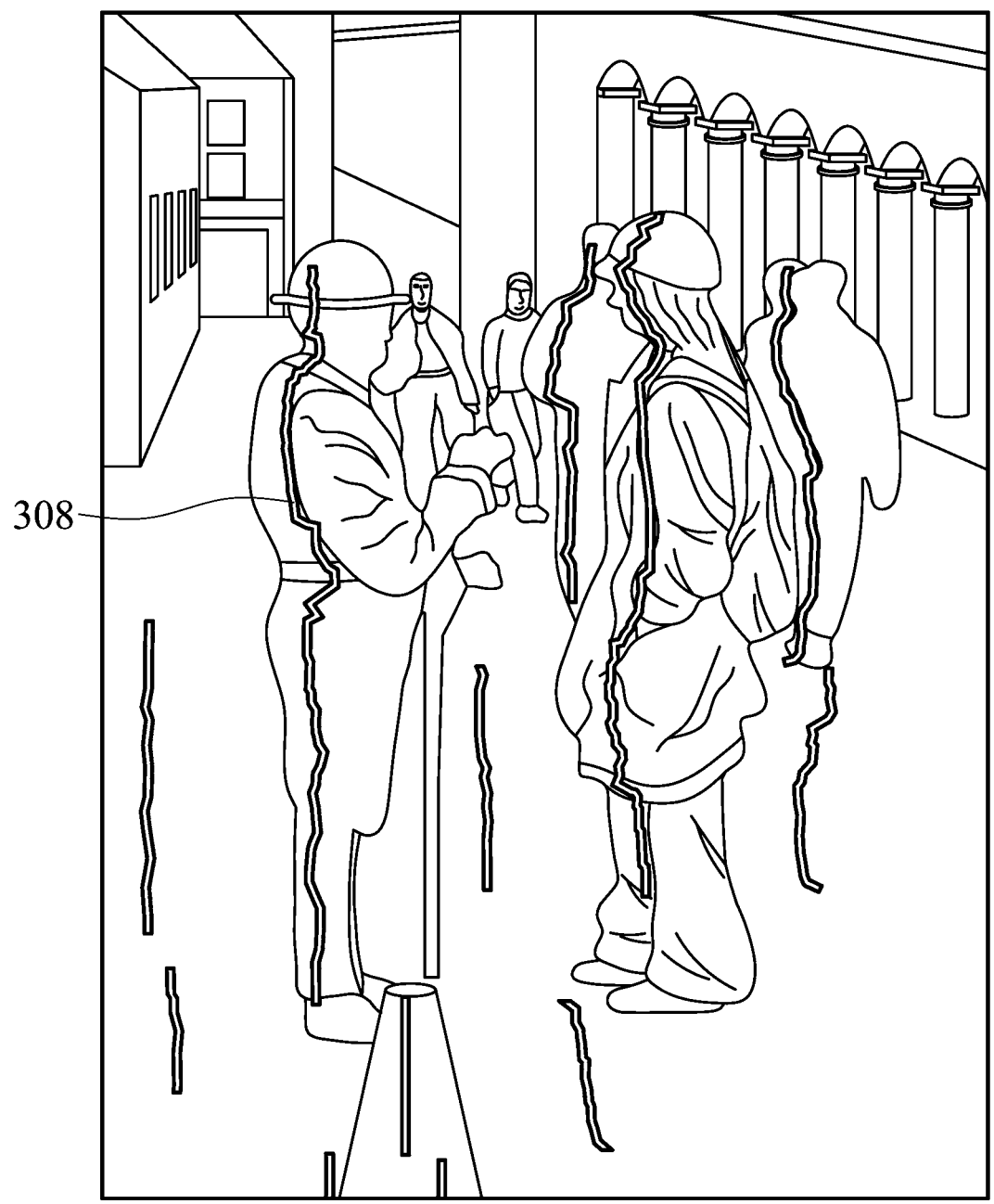
FIG. 3B illustrates a diagram of the adjusted stereoscopic image pair according to an embodiment of the disclosure.
Figure 3C:
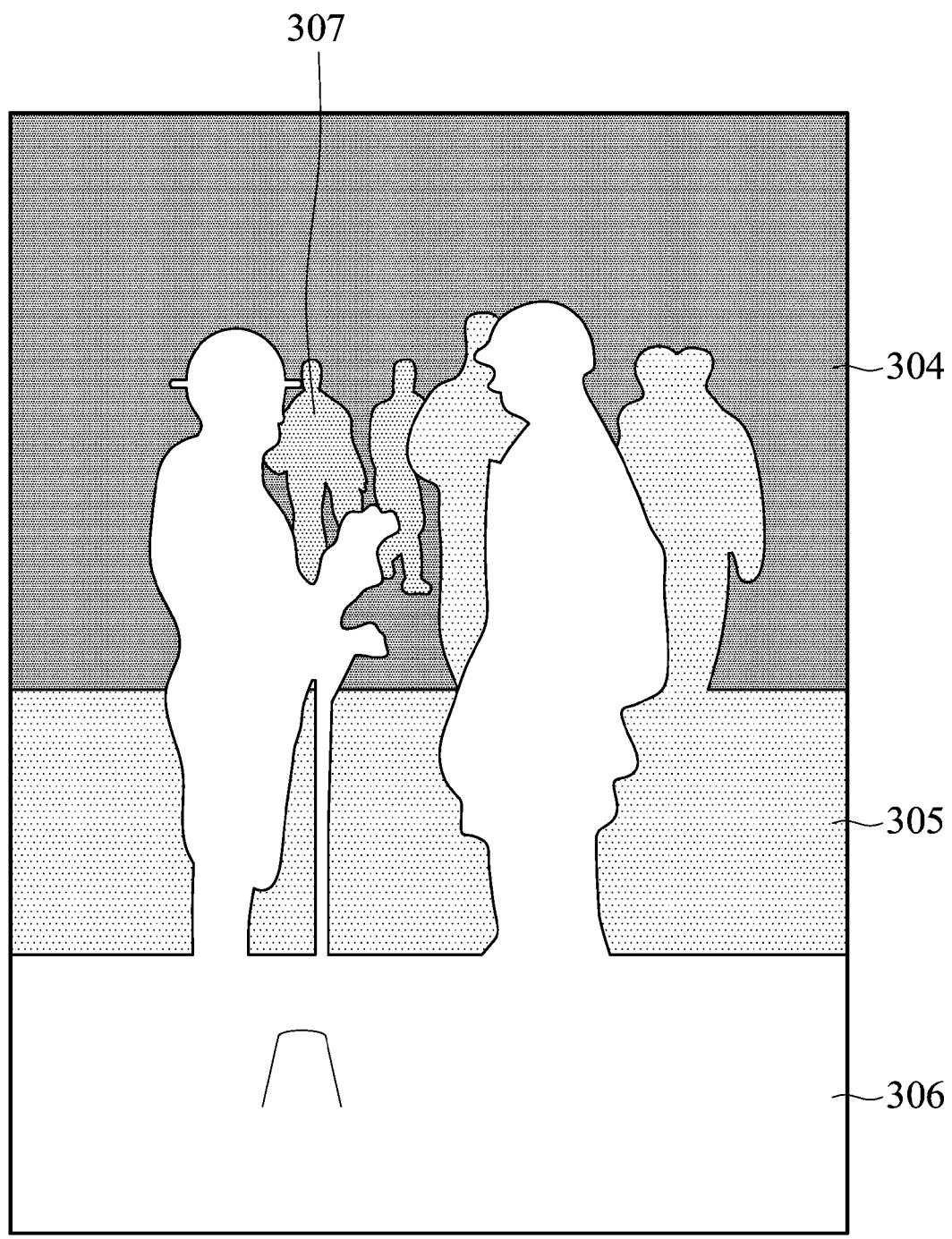
FIG. 3C illustrates a diagram of the depth image according to an embodiment of the disclosure.

FIG. 2 illustrates a block diagram of the stereoscopic image system 200. In an embodiment, the stereoscopic image system 200 may comprises a depth detection unit 210, a stereoscopic image generator 220, and a stereoscopic image adjusting apparatus 230. The depth detection unit 210 is capable of receiving a two-dimensional image and a corresponding depth image, and generating a depth level map according to the two-dimensional image and the corresponding depth image, wherein the two-dimensional image can be pictures captured by a common camera, and the depth image may be a gray-level image with gray level values from 0 to 255. As illustrated in FIG. 3C, levels 304 to 307 express different depth levels of the object in the image, respectively, wherein level 306 indicates the nearest position from the lens, and level 307 indicates the farthest position from the lens. Generally, the depth image can be obtained by using a depth camera or images with three-dimensional information, or be derived from the two-dimensional image by using conventional algorithms, but the disclosure is not limited thereto. In a gray-level image, different gray levels indicate different depth distances which are away from the lens of the camera. For example, gray level 0 indicate the farthest position from the lens, and gray level 255 indicates the nearest position from the lens, but the disclosure is not limited thereto. The depth detection unit 210 is capable of calculating a gray level of a best plane with zero parallax according to the received depth image by using a well-known Otsu threshold method. The depth detection unit 210 is further capable of dividing the gray levels in the depth image into 11 depth levels, where depth level 0 indicates the plane with zero parallax. The relationship between the depth image and depth levels can be expressed by the following formula:

$$\text{depth level}=(D-ZPS)/((255-ZPS)/5) \text{ when } D \neq ZPS \quad (1)$$

$$\text{depth level}=0 \text{ when } D=ZPS \quad (2)$$

wherein depth level represents the depth level, D represents the gray level of the point, and ZPS (zero parallax setting) represents the gray level of the plane with zero parallax. The depth detection unit 210 may use the formulas (1) and (2) to generate a depth level map for classifying depth levels. A larger value of the depth level indicates a nearer position from the lens, and thus the required viewing angle may be larger. The details will be described in the following sections. In another embodiment, the depth levels can be determined by the definition of positive parallax, zero parallax, and negative parallax upon requirement. Alternatively, a larger depth level may indicate a farther position from the lens, but the disclosure is not limited thereto.

The stereoscopic image generator 220 is capable of receiving the two-dimensional and the depth level map generated by the depth detection unit 210, and generating a stereoscopic image pair corresponding to the two-dimensional image according to the two-dimensional image and the depth level map. The stereoscopic image pair comprises a left eye image and a right eye image, and the stereoscopic image generator 220 uses the well-known DBIR (Depth-image-based rendering) algorithm to generator the left eye image and the right eye image. Note that the details will not be described here. In a stereoscopic image system using passive eyeglasses (i.e. passive polarized stereoscopic image system), the left eye/right eye images are the images with a half vertical resolution of the original two-dimensional image, respectively. For example, the left eye image is composed by the odd lines of the original two-dimensional image, and the right eye image is composed by the even lines of the original two-dimensional image, but the disclosure is not limited thereto.

The stereoscopic image adjusting apparatus 230 is capable of receiving the depth level map generated by the depth detection unit 210 and the stereoscopic image pair corresponding to the depth level map generated by the stereoscopic image generator 220. The stereoscopic image adjusting apparatus 230 is further capable of generating a depth level range map according to the depth level map, and performing a pixel shifting process and an interpolation process to the objects for a plurality of depth levels to generate an output stereoscopic image pair. The stereoscopic image adjusting apparatus 230 may use the image adjusting method in the application to adjust the left eye image and the right eye image in the stereoscopic image pair, thereby the user may obtain a better stereoscopic visual effect while viewing the output stereoscopic image pair. In an embodiment, the stereoscopic image adjusting apparatus 230 may further comprise a depth level classifier 231, a pixel shifting unit 232, and an image combining unit 233. The depth level classifier 231 is capable of determining a range of depth levels of the object for follow-up processing according to the depth level map, and generating a depth level range map for the pixel shifting unit 232. In an embodiment, when the object is located at a far position from the eyes upon simulating the viewing angles, there is nearly no difference between the left eye image and the right eye image. Thus, the depth level classifier 231 may merely consider the object within the depth level between 2 and 4, as illustrated in FIG. 3A, wherein the depth levels of level 301, 302, and 303 are 2, 3, 4, respectively. The depth level 2 indicates that the object is located at the closest position to the plane with zero parallax and is farthest from the lens, and the depth level 4 indicates that the object is located at the farthest position to the plane with zero parallax, and the closest position to the lens, but the disclosure is not limited thereto.

The pixel shifting unit 232 is capable of receiving the depth level range map generated by the depth level classifier 231 and the stereoscopic image pair corresponding to the depth level map generated by the stereoscopic image generator 220, and generating an adjusted stereoscopic image pair according to the depth level range map and the corresponding stereoscopic image pair, wherein the adjusted stereoscopic image pair comprises a left eye image and a right eye image. For the passive polarized stereoscopic image system, the left eye image and the right eye image are composed by the odd lines and even lines of the original two-dimensional image, respectively, but the disclosure is not limited thereto. In an embodiment, the pixel shifting unit 232 perform respective pixel shifting processing to the left eye image and the right eye image in the stereoscopic image pair according to the depth level range map and the corresponding stereoscopic image pair. In another embodiment, for the same object, the left side of the object in the left eye image is relatively larger, and the right side in the left eye image is relatively smaller. Contrarily, the right side of the object in the right eye image is relatively larger, and the left side in the right eye image is relatively smaller. Thus, when the left eye image is processed by the pixel shifting unit 232, the left side of the object is enlarged, and the right side of the object is shrunk. In yet another embodiment, if the pixels belong to the same object in the left eye image (or the right eye image), the pixels have the same depth level. The pixel shifting unit 232 will find the object in the left eye image (or the right eye image) first. Accordingly, the pixel shifting unit 232 may process each row of the corresponding left eye image to find the center of the object according to the depth level range map. That is, the pixel shifting unit 232 may find the center points of line segments with the same depth level for pixels in each row, and the center line of the object can be obtained by combining all the center points of the line segments. In an embodiment, taking a picture with 640×480 resolution for example, the pixel shifting unit 232 may process each line segments in the left eye image according to the following equation:

$$X=X+(DP-1)$$

when $(X>(DC-WD/4))$ and $(X<(DC+WD/4))$ and $(DP>=2)$ \hfill (3)

Figure 3D:
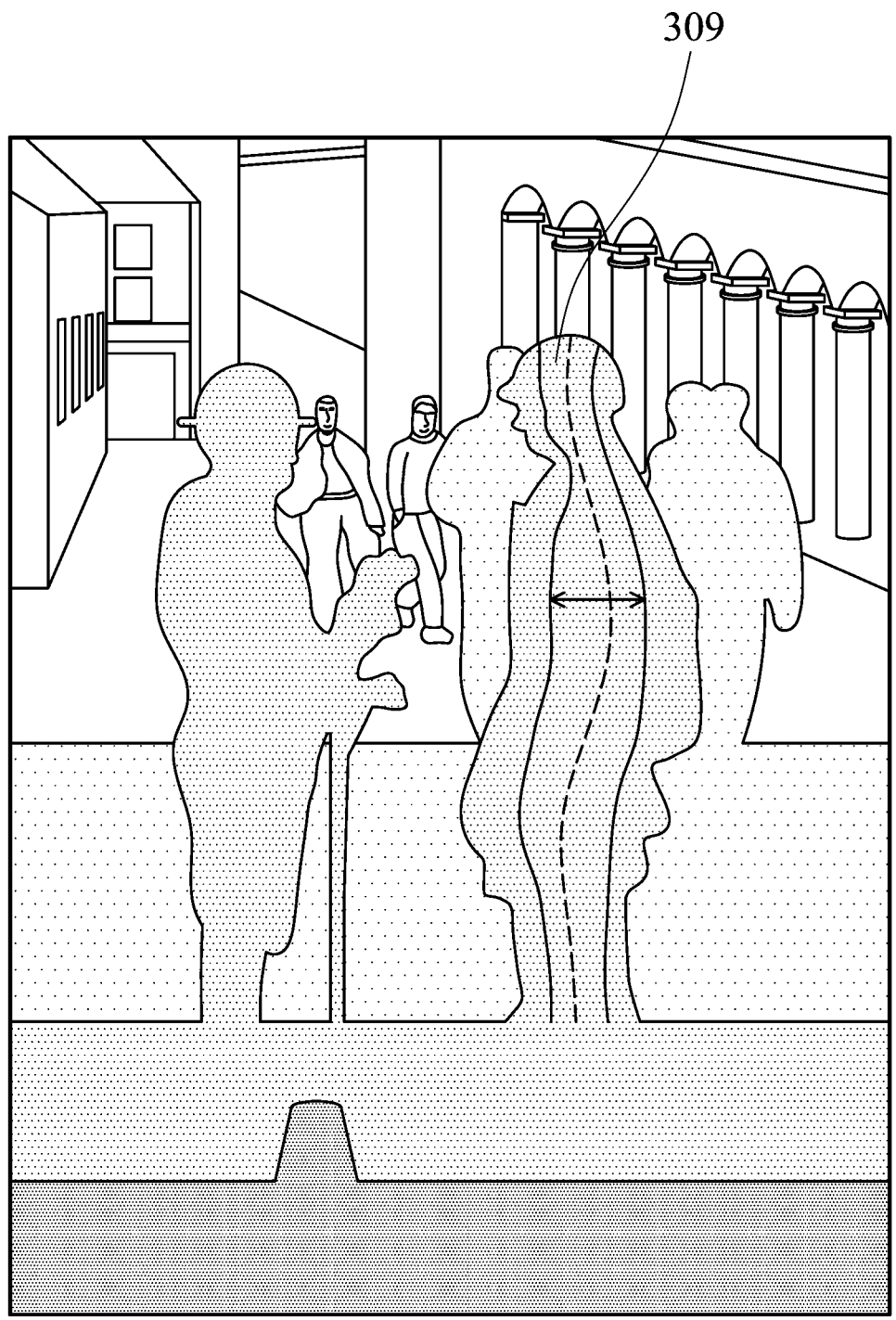
FIG. 3D illustrates a diagram of performing the pixel shifting process to the left eye image in the stereoscopic image pair according to an embodiment of the disclosure.

The pixel shifting unit 232 may process each line segments in the right eye image according to the following equation:

$$X=X-(DP-1)$$

when $(X>(DC-WD/4))$ and $(X<(DC+WD/4))$ and $(DP>=2)$ \hfill (4)

wherein X represents the coordinate of the pixel in the same depth level; DP represents the depth level; DC represents the coordinate of the center (i.e. middle point) of the line segments in the same depth level; and WD represents the width of the line segment in the same depth level in each row (i.e. the width of the object in each row). From equations (3) and (4), it can be appreciated that due to right-shifting of the area 309, the left side of the object may be extended by the pixel shifting unit 232 with extra pixels at the distance of the quarter width of the object from the center to the left in each row of the left eye image, and the pixels at the distance of the quarter width of the object from the center to the right will be removed if exceeding the boundary (i.e. the quarter width of the object from the middle point to the right). The pixel shifting unit 232 will perform contrary processing to the right eye image. Therefore, after processing each row of the left eye image (or the right eye image), the adjusted object in the adjusted stereoscopic image pair will be closer to realistic images when observed by the left eye (or the right eye). In other words, the aforementioned pixel shifting process indicates that the pixels of the object at the distance of the quarter width of the object from the center to the left and right (i.e. the left boundary and the right boundary) are performed by a corresponding pixel shifting process according to the center line of the object. That is, the pixels are removed when exceeding the left boundary (or the right boundary) after the pixel shifting process, and the extended pixels due to the pixel shifting process can be obtained by interpolation, as illustrated in FIG. 3D. For the left eye image, pixels in the area 309 are totally right shifted, but the disclosure is not limited thereto. It should be noted that, the number of extended or removed pixels in the predetermined depth level range is not affected by the resolution of the image, and the aforementioned embodiment merely illustrates the image of a 640×480 resolution, and only the objects within the depth level from 2 to 4 are processed. The number of extended or removed pixels in the pixel shifting process is DP−1, wherein DP represents the depth level. If an image with a 1920×1080 resolution is used, the number of extended or removed pixels is still DP−1.

The image combining unit 233 is capable of receiving the adjusted stereoscopic image pair and the corresponding depth level information from the pixel shifting unit 232. The pixel shifting unit 232 may perform corresponding pixel shifting (extending or removing) processes to the left eye/right eye images in the adjusted stereoscopic image pair. The image combining unit 233 may further process the received adjusted stereoscopic image pair by performing an interpolation process to the extended pixels with a well-known interpolation method. Specifically, the extended pixels are empty in the adjusted stereoscopic image pair, as illustrated in FIG. 3B. The area 308 is an empty area generated by the pixel shifting process, and the image combining unit 233 may use the neighboring pixels of the empty area 308 to perform interpolation to fill the empty area 308, thereby generating the output stereoscopic image pair. Further, the interpolation method used by the image combining unit 233 may choose the closest neighboring pixel at an integer position. If several neighboring pixels have the same distance to the empty area 308, the image combining unit 233 may choose one of them freely and change the calculation of distance by rounding the fraction part of the pixel.

Figure 4:
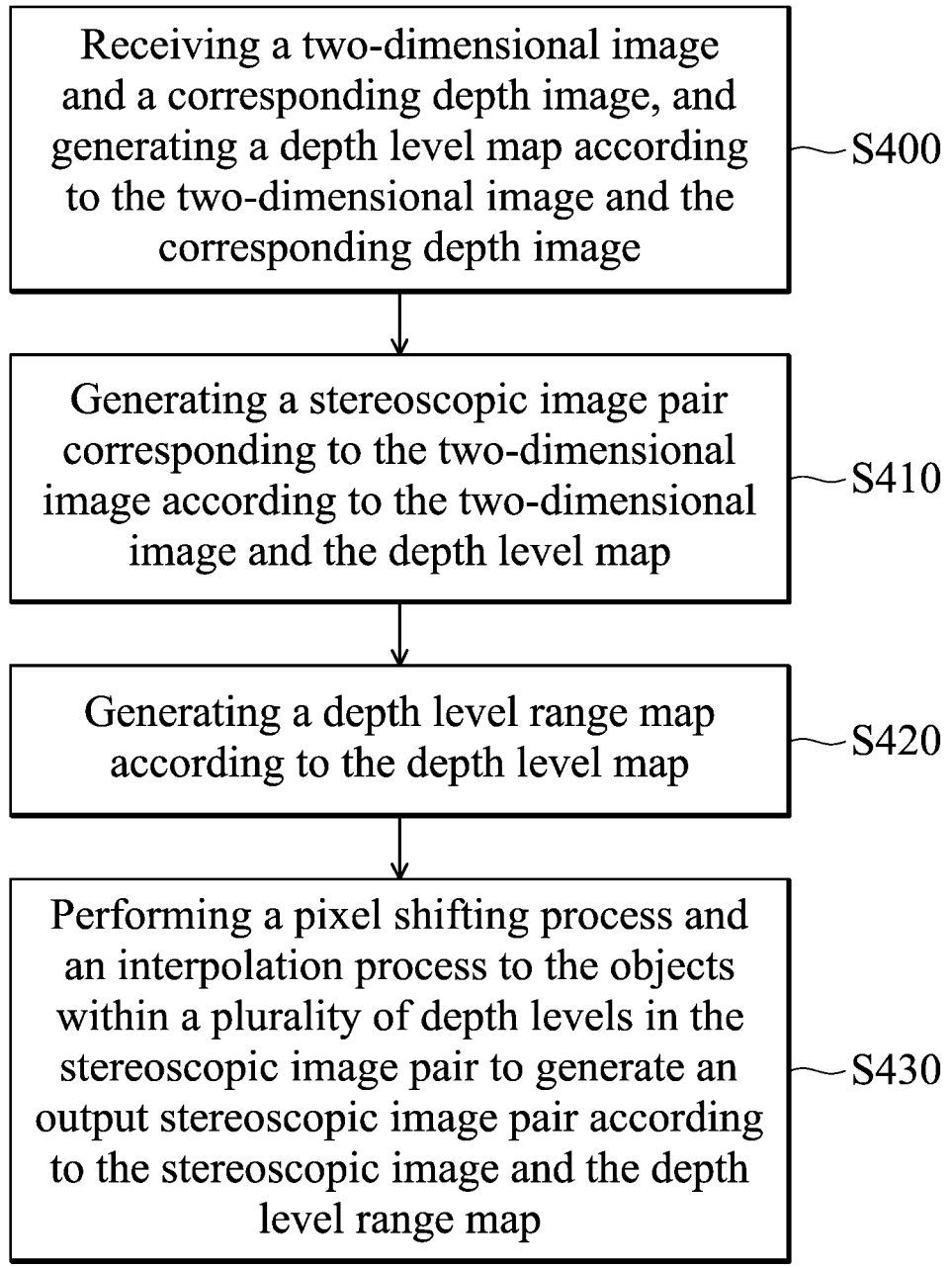
FIG. 4 illustrates a flow chart of the stereoscopic image generating method used in the stereoscopic image system according to an embodiment of the disclosure.

FIG. 4 illustrates a flow chart of the stereoscopic image generating method used in the stereoscopic image system 200. In step S400, the depth detection unit 210 may receive a two-dimensional image and the corresponding depth image, and generate a depth level map. In an embodiment, the depth image is captured by a depth camera or obtained from the image with three-dimensional information. The depth image is a gray-level image, which uses gray levels from 0 to 255 to represent different depth levels. In step S410, the stereoscopic image processing unit may generate a stereoscopic image pair corresponding to the two-dimensional image, wherein the stereoscopic image generator 220 may use the well-known DIBR algorithm to perform image processing to the two-dimensional image to generate an adjusted stereoscopic image pair corresponding to the left eye image and the right eye image. In step S420, the stereoscopic image adjusting apparatus 230 may generate a depth level range map according to the depth level map. In step S430, the stereoscopic image adjusting apparatus 230 may perform a pixel shifting process and an interpolation process to the objects at a plurality of depth levels in the adjusted stereoscopic image pair to generate an output stereoscopic image pair. The details of the steps S420 and S430 performed by the stereoscopic image adjusting apparatus 230 will be described in the following section with FIG. 5.

Figure 5:
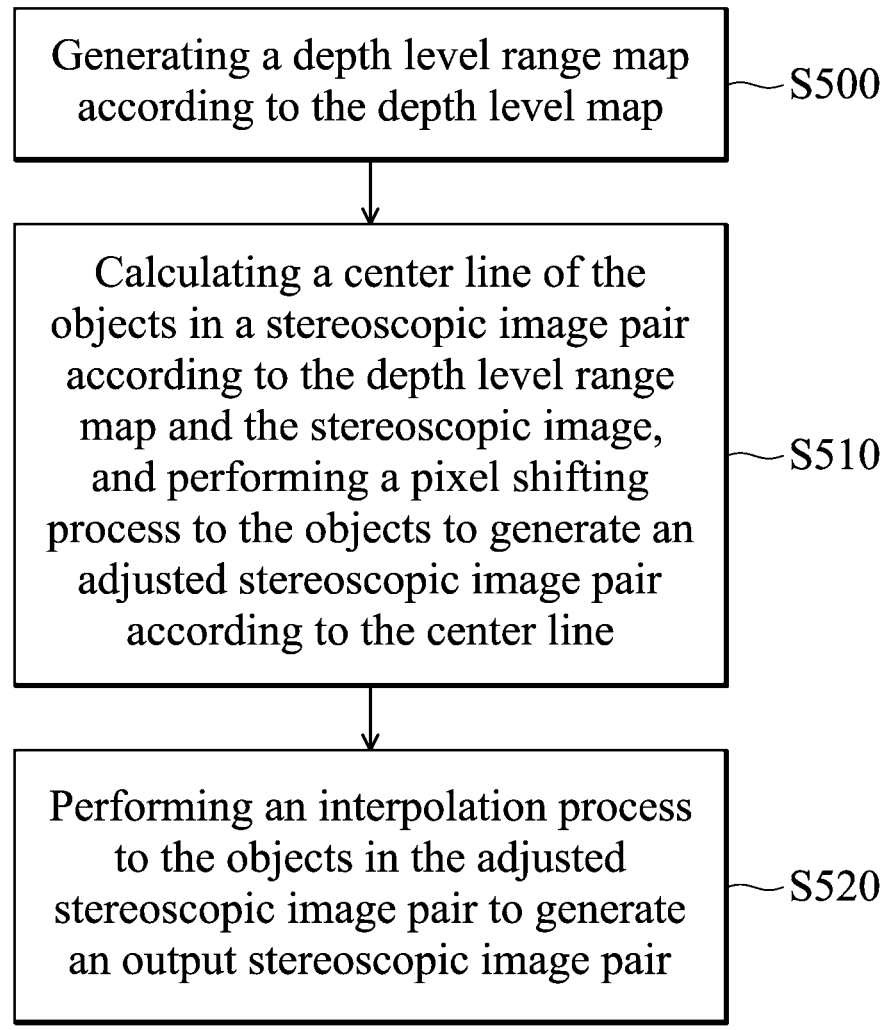
FIG. 5 illustrates a flow chart of the stereoscopic image adjusting method used in the stereoscopic image adjusting apparatus according to an embodiment of the disclosure.

FIG. 5 illustrates a flow chart of the image adjusting method used in the stereoscopic image adjusting apparatus 230. In step S500, the depth level classifier 231 may receive the depth level map from the depth detection unit 210, and generate a depth level range map according to a predetermined depth range (e.g. +2~+4) to filter the depth level map. In step S510, the pixel shifting unit 232 may receive the depth level range map generated by the depth level classifier 231 and the stereoscopic image pair generated by the stereoscopic image generator 220. The pixel shifting unit 232 may also generate an adjusted stereoscopic image pair according to formulas (3) and (4) to perform a pixel shifting process to the objects in the stereoscopic image pair. In step S520, the image combining use 233 may receive the adjusted stereoscopic image pair generated from the pixel shifting unit 232, and use an interpolation method to perform an interpolation process to the objects in the stereoscopic image pair to fill the pixels in the empty area incurred by the pixel shifting process to generate an output stereoscopic image pair. The output stereoscopic image is further displayed on a corresponding three-dimensional display (not shown).

In the aforementioned embodiment, it should be appreciated that for those who are skilled in the art, the depth detection unit 210, the stereoscopic image generator 220 and the stereoscopic image adjusting apparatus 230 can be implemented by program codes executed by a processor, or implemented by a specific integrated circuit, which is not limited to the form of software.

The stereoscopic image generating method, the stereoscopic image adjusting method, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine, such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stereoscopic image system, comprising
a memory for storing a program; and
a processor configured to execute the program to perform the steps of:
receiving a two-dimensional image and a corresponding depth image, wherein the corresponding depth image is a gray-level image;
generating a depth level map with a predetermined number of depth levels according to the gray-level image, wherein a depth range of each depth level of the depth level map does not overlap with each other;
generating a stereoscopic image pair corresponding to the two-dimensional image according to the two-dimensional image and the depth level map;
generating a depth level range map by retrieving a portion of the depth levels within a predetermined depth range from the depth level map; and
performing a pixel shifting process and an interpolation process to objects that are in the depth levels within the predetermined depth range of the depth level range map in the stereoscopic image pair to generate an output stereoscopic image pair,
wherein the processor further calculates a center line of each object in the stereoscopic image pair according to the depth level range map, and performs the pixel shifting process to the stereoscopic image pair to generate the output stereoscopic image according to the center line,
wherein the stereoscopic image pair comprises a left eye image and a right eye image and for each object in a set of objects that has a depth that falls within the depth level range map, each respective object undergoes the pixel shifting process such that a right shifting process is performed only to a portion of the object located at a distance of a quarter width from the center line of the object to the left and right in the left eye image, and a left shifting process is performed only to the portion of the object located at the distance of the quarter width from the center line of the object to the left and right in the right eye image.

2. The stereoscopic image system as claimed in claim 1, wherein the two-dimensional image and the corresponding depth image is generated by a depth camera.

3. The stereoscopic image system as claimed in claim 1, wherein the interpolation process indicates an interpolation method, and the processor further displays the output stereoscopic image pair on a three-dimensional display.

4. A stereoscopic image generating method, comprising:
receiving a two-dimensional image and a corresponding depth image, wherein the corresponding depth image is a gray-level image;
generating a depth level map with a predetermined number of depth levels according to the gray-level image, wherein a depth range of each depth level of the depth level map does not overlap with each other;
generating a stereoscopic image pair corresponding to the two-dimensional image according to the two-dimensional image and the depth level map;
generating a depth level range map by retrieving a portion of the depth levels within a predetermined depth range from the depth level map; and
performing a pixel shifting process and an interpolation process to objects that are in the depth levels within the predetermined depth range of the depth level range map in the stereoscopic image pair to generate an output stereoscopic image pair according to the stereoscopic image pair and the depth level range map, wherein the step of generating the output stereoscopic image comprises:
calculating a center line of each object in the stereoscopic image pair according to the depth level range map; and
performing the pixel offset processing to the stereoscopic image pair to generate the output stereoscopic image pair according to the center line,
wherein the stereoscopic image pair comprises a left eye image and a right eye image and for each object in a set of objects that has a depth that falls within the depth level range map, each respective object undergoes the pixel shifting process such that a right shifting process is performed only to a portion of the object located at a distance of a quarter width from the center line of the object to the left and right in the left eye image, and a left shifting process is performed only to the portion of the object located at the distance of the quarter width from the center line of the object to the left and right in the right eye image.

5. The stereoscopic image generating method as claimed in claim 4, wherein the two-dimensional image and the corresponding depth image is generated by a depth camera.

6. The stereoscopic image generating method as claimed in claim 4, wherein the interpolation process indicates an interpolation method, and the method further comprises:
displaying the output stereoscopic image pair on a three-dimensional display.

7. A stereoscopic image adjusting apparatus, comprising:
a memory for storing a program; and
a processor configured to execute the program to perform the steps of:
receiving a depth level map and generating a depth level range map according to the depth level map;
receiving the depth level range map and a corresponding stereoscopic image pair, calculating a center line of each object in the stereoscopic image pair according to the depth level range map and the corresponding stereoscopic image pair, and generating an adjusted stereoscopic image pair by performing a pixel shifting process to the object according to the center line; and
receiving the adjusted stereoscopic image pair and performing an interpolation process to the objects in the adjusted stereoscopic image pair to generate an output stereoscopic image pair,
wherein the depth level map is a gray-level image with a predetermined number of depth levels, and the processor further chooses the depth level range map with a predetermined depth range from the depth level map,
wherein the stereoscopic image pair comprises a left eye image and a right eye image and for each object in a set of objects that has a depth that falls within the depth level range map, each respective object undergoes the pixel shifting process such that the processor performs a right shifting process only to a portion of the object located at a distance of a quarter width from the center line of the object to the left and right in the left eye image, and performs a left shifting process only to the portion of the object located at the distance of the quarter width from the center line of the object to the left and right in the right eye image.

8. The stereoscopic image adjusting apparatus as claimed in claim 7, wherein the processor uses an interpolation method to perform the interpolation process to the portion of the objects located at the distance of the quarter width of the objects from the center line to the left in the left eye image, and to perform the interpolation process to the portion of the objects located at the distance of the quarter width of the objects from the center line to the right in the right eye image.

9. The stereoscopic image adjusting apparatus as claimed in claim 7, wherein the stereoscopic image pair comprises a left eye image and a right eye image, and the pixel shifting process indicates that the processor performs a right shifting process to a portion of the objects located at a distance of a quarter width of the objects from the center line to the left and right in the left eye image, and performs a left shifting process to the portion of the objects located at the distance of the quarter width of the objects from the center line to the left and right in the right eye image.

10. The stereoscopic image adjusting apparatus as claimed in claim 7, wherein the processor uses an interpolation method to perform the interpolation process to the portion of the objects located at the distance of a quarter width of the objects from the center line to the left in the left eye image, and to perform the interpolation process to the portion of the objects located at the distance of the quarter width of the objects from the center line to the right in the right eye image.

11. A stereoscopic image adjusting method, comprising:
receiving a depth level map, and generating a depth level range map according to the depth level map;
calculating a center line of each object in a stereoscopic image pair according to the depth level range map and the stereoscopic image, and performing a pixel shifting process to the objects to generate an adjusted stereoscopic image pair according to the center line;
performing an interpolation process to the objects in the adjusted stereoscopic image pair to generate an output stereoscopic image pair, wherein the depth level map is a gray-level image with a predetermined number of depth levels; and
choosing the depth level range map with a predetermined depth range from the depth level map,
wherein the stereoscopic image pair comprises a left eye image and a right eye image and for each object in a set of objects that has a depth that falls within the depth level range map, each respective object undergoes the pixel shifting process such that a right shifting process is performed only to a portion of the object located at a distance of a quarter width from the center line of the object to the left and right in the left eye image, and a left shifting process is performed only to the portion of the object located at the distance of the quarter width from the center line of the object to the left and right in the right eye image.

12. The stereoscopic image adjusting method as claimed in claim 11, further comprising:
using an interpolation method to perform the interpolation process to the objects in the adjusted stereoscopic image.

13. The stereoscopic image adjusting method as claimed in claim 11, wherein the stereoscopic image pair comprises a left eye image and a right eye image, and the pixel shifting process indicates that the pixel shifting unit performs a right shifting process to a portion of the objects located at a distance of a quarter width of the objects from the center line to the left and right in the left eye image, and performs a left shifting process to the portion of the objects located at the distance of the quarter width of the objects from the center line to the left and right in the right eye image.

14. The stereoscopic image adjusting method as claimed in claim 11, further comprising:
using an interpolation method to perform the interpolation process to the objects in the adjusted stereoscopic image.

* * * * *